(12) United States Patent
Mc George, Jr.

(10) Patent No.: US 6,629,098 B2
(45) Date of Patent: Sep. 30, 2003

(54) METHOD AND SYSTEM FOR VALIDATING DATA SUBMITTED TO A DATABASE APPLICATION

(75) Inventor: Vernon E. Mc George, Jr., San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 391 days.

(21) Appl. No.: 09/765,883

(22) Filed: Jan. 16, 2001

(65) Prior Publication Data

US 2002/0095406 A1 Jul. 18, 2002

(51) Int. Cl.[7] .............................................. G06F 17/30
(52) U.S. Cl. ................................ 707/6; 707/2; 707/102
(58) Field of Search ............................... 707/6, 102, 2, 707/3, 5, 203, 4; 705/10

(56) References Cited

U.S. PATENT DOCUMENTS

| | | | | |
|---|---|---|---|---|
| 5,991,758 A | * | 11/1999 | Ellard | 707/6 |
| 6,115,694 A | * | 9/2000 | Cheetham et al. | 705/10 |
| 6,341,282 B1 | * | 1/2002 | Sharpe et al. | 707/3 |
| 6,377,932 B1 | * | 4/2002 | DeMarcken | 705/5 |
| 6,389,414 B1 | * | 5/2002 | Delo et al. | 707/4 |

* cited by examiner

Primary Examiner—Sanjiv Shah

(57) ABSTRACT

A system and method for validating data entry in which an exception set class is defined and where, during a validation process, each data entry field is reviewed to determined whether or not certain predetermined validation criteria are met. Where data entry does not meet validation criteria, an exception is added to the exception set class to identify the data entry field that contains data that does not meet the validation criteria. After all data entry fields have been reviewed, the exception set is thrown if it contains any exceptions. Based upon this exception set, the data entry fields will be re-presented (submitted) to the user for correction/revision of the data to meet the validation criteria.

3 Claims, 7 Drawing Sheets

METHOD AND SYSTEM FOR VALIDATING DATA SUBMITTED TO A DATABASE APPLICATION

TECHNICAL FIELD

The present invention is generally related to a system and method for validating data entry and, more particularly, is related to a system and method for validating data entry by establishing an exception set upon submission of data and adding exceptions to the exception set where data cannot be validated.

BACKGROUND OF THE INVENTION

In data collection systems wherein data is solicited and input via an entry data entry form made up of multiple data entry fields, it is typical that when the data entry form is submitted to the database application for entry, each data entry field is validated against a predetermined criteria. This process is generally referred to as validating the data input. This validation process is often used to ensure that data is input in the proper format and within a reasonable range of expected values. For example, a data entry field which solicits a telephone number should not typically include letters. Thus, during the validation process, the criteria established for this data entry field which requires that all data input into the telephone number field be numeric will be checked. To assure validation consistency among all applications using a database, the validation criteria is typically defined by a set of validation rules. The validation rules are often included as a part of, and enforced by, the database application. If the criteria is not met, validation will fail and will require correction of the entered data before it can be accepted and stored in the database. Typically, once the submitted data has failed to be validated, no further data entry fields on the submitted data entry form will be reviewed regardless of whether or not the other data fields contain valid data which meets all predetermined criteria for validation. This failure in data validation results in the database application generating an exception indicating that the submitted data entry form contains data which does not meet the predefined criteria for validation. The data entry form is presented to a user again. The user can then make corrections to data entry fields as may be necessary and then resubmit the data entry form. Upon re-submission, the data entry fields of the data entry form are again reviewed (submitted for validation). Where multiple errors have been made in the entry of data in the data fields of the submitted form, the typical database system will reject the submitted data form by generating multiple exceptions and representing the data form to a user for correction until each and every invalid data field meets the predetermined criteria. This is a time consuming, resource consuming, iterative process. Typical database systems cause the graphical user interface (GUI) used to present the data entry form to a user, to iterate and be presented to the user for correction each time validation of data entry fails. This increases the time and resources required to validate all fields of data entered.

Thus, a heretofore unaddressed need exists in the industry to address the aforementioned deficiencies and inadequacies.

SUMMARY OF THE INVENTION

The present invention provides a system and method for validating data submitted to a database application.

Briefly described, in architecture, the system can be implemented as follows. A client-side network device is provided for receiving data entry from a user, and submitting the data to a database via a server application. A database is provided for receiving the data entry. The database application validates data submitted to the database. The present invention can also be viewed as providing a method for validating data. In this regard, the method can be broadly summarized by the following steps: receiving data input; validating data input; adding an exception to an exception set when data input cannot be validated; and returning multiple validation errors.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The present invention provides for a method and system for validating data submitted to a server and database application, hereinafter known as the data survey collection system. With the data survey collection system, data input may be submitted from, for example, a client-side network device, via a data entry form presented to a user via a graphical user interface (GUI). This data input is then submitted to a server application for incorporation of the data into a database. The data entry form presented to the user via the GUI typically will include multiple data entry fields, each for receiving data input of a particular type. The data input is then submitted to a server application. In turn, the server application will submit the data to the database application. In some embodiments, the server application and database application may be integrated into a single application.

The database application will review each field of the submitted data input to ensure that it meets predetermined criteria (validation rules). This review process is referred to as data validation. Where a data field is found to not meet the validation rules, the data is said to be invalid and a validation error occurs. When a validation error occurs the database application will generate an exception object (exception) that identifies the data field of the submitted input data that is invalid. Each exception identifying data fields found to contain invalid data will be included in an exception set that aggregates all generated exceptions which specify data fields containing invalid data input. Subsequently, after all data fields of submitted data input have been validated, the exception set containing all exceptions identifying the data fields containing invalid data input will be provided to a client-side network device for correction.

Where data entry cannot be validated, the server application will aggregate, or accumulate, the exceptions generated for each field of data input which contains invalid data into a single exception set. This exception set will then be returned to the client-side network device. The client-side network device will then process the validation failures specified by the exceptions contained in the exception set at one time by presenting all of the questions to the user again, which are associated with the data fields specified in the exception set as containing invalid data. The user will then have the opportunity to make corrections and re-entry of all invalid data at one time, thereby improving the work efficiency of the user and reducing the overall system processing time.

Figure 1:
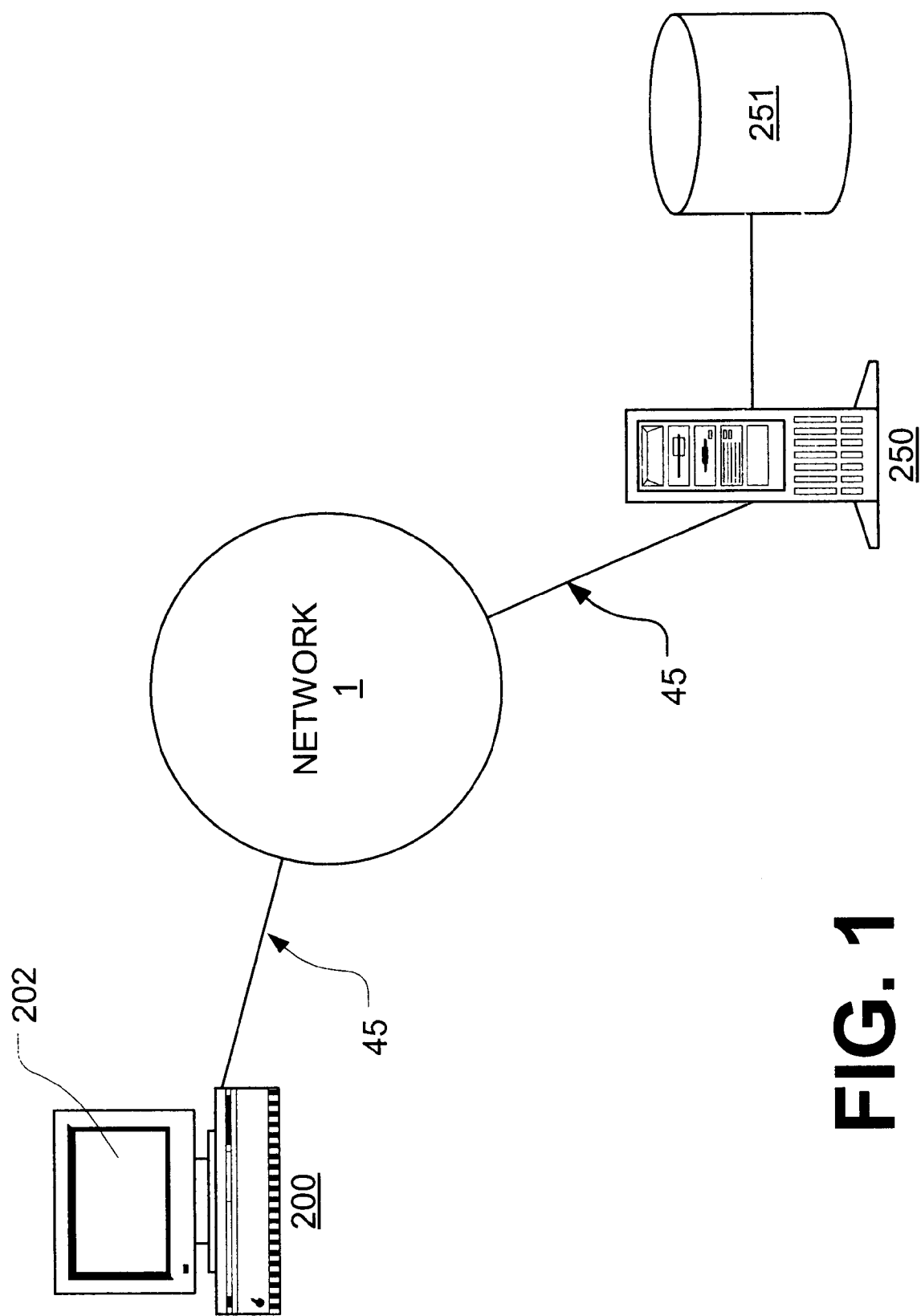
FIG. 1 is an illustration of one embodiment of a system according to the present invention where data is collected at a client-side terminal and submitted over a network to a database residing on a server.

FIG. 1 illustrates an embodiment of the data survey collection system of the present invention. There is shown a client-side terminal 200. Client-side terminal 200 includes a display device 202 and a network interface 45. Client-side terminal 200 is connected to network 1 via network interface 45. A database server 250 is provided for receiving data and updating data stored in database 251. Client-side terminal 200 presents a form 602 (FIG. 2) to a user via, for example, a graphical user interface 600 (GUI) (FIG. 2) displayed on display device 202. Network 1 may be, for example, a local area network (LAN), a wide area network (WAN) or the Internet. Network interface 45 may be, for example, a wireless interface, such as a radio frequency (RF) or infrared (IR) interface. Additionally, network interface 45 may be a wired type interface in which data is transmitted via an electrical or optical cable. A user inputs data solicited via the form. The data input is then provided to database server 250, which causes the data input to be incorporated into the database 251 after it has been validated to confirm that predetermined rules (example: format) have been met. Client-side terminal 200 may be, for example, a personal computer, a kiosk, a wireless access protocol (WAP) compliant device, personal digital assistant (PDA) or other web enabled device. Further, it will be recognized by those skilled in the art that client-side terminal 200 can be configured so as to include all functional aspects of database server 250 and database 251, thus alleviating any need for a separate database server 250, database 251 or network 1, if so desired.

Figure 2:
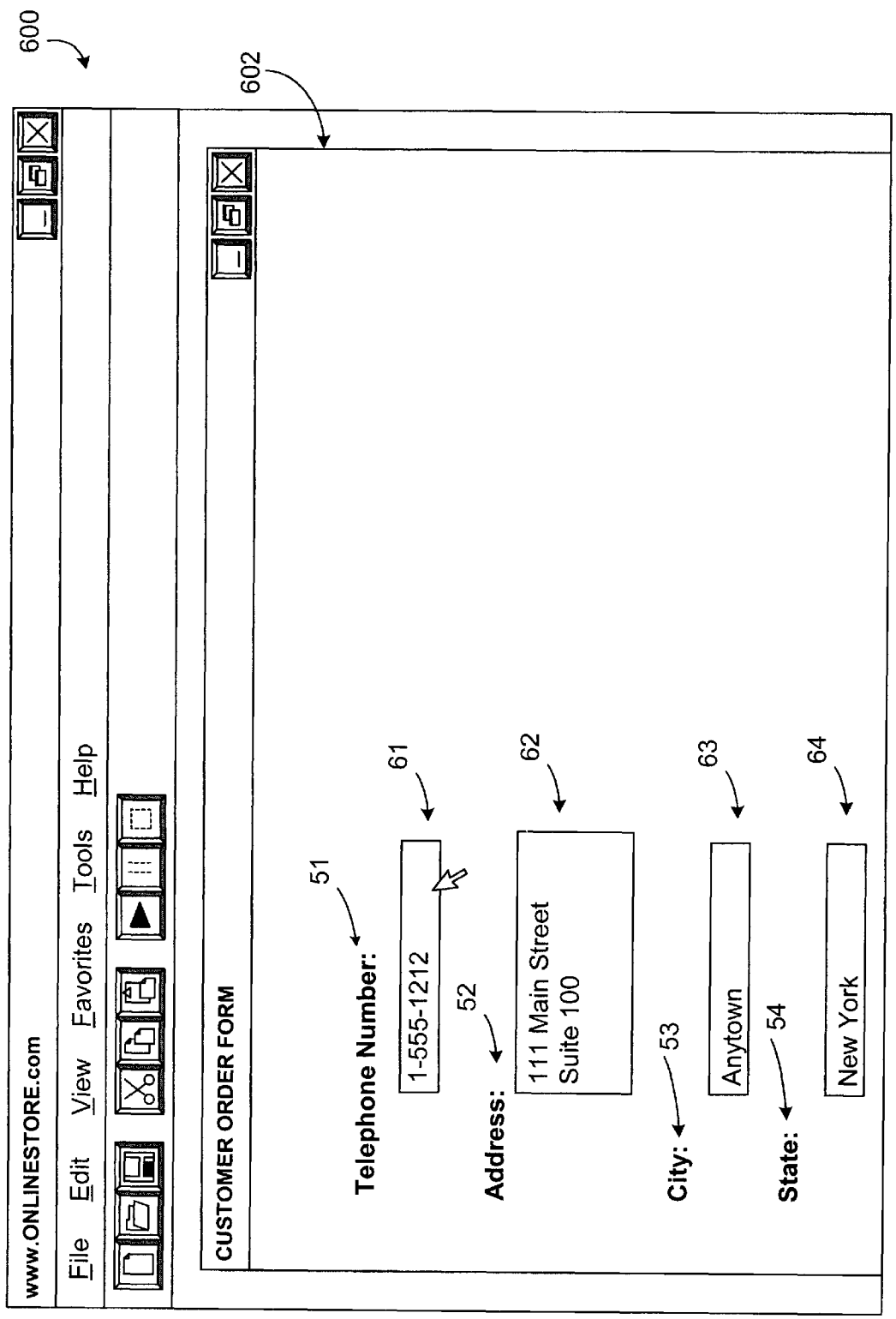
FIG. 2 is an illustration depicting one example of a GUI presenting a data entry form.

FIG. 2 illustrates a graphical user interface (GUI) 600, which is displayed on a display device 202 (FIG. 1). GUI 600 is used to present a visual representation of a data entry form 602 to a user. Data entry form 602 includes a series of questions 51, 52 and 53 that are answered via user input in the respective input fields 61, 62, 63 or 64. In answering (responding to) a question (query), it is important that the user input answer data in the proper format. For example, question 51 ("Telephone Number:") solicits telephone number information. The proper format of an answer (response) to this question will require, for example, that all data input be numeric, of a certain length, and/or a certain order. It will be recognized that the format could also specify that the answer conform or otherwise exhibit other predetermined attributes. Once the user has completed answering the questions 51 through 54, of data entry form 602, the data will be submitted to database server 250 (FIG. 1) for validation. During the validation process, the user's response to each question will be checked to confirm that it meets predetermined requirements specified by a set of validation rules. For example, the validation rules may specify the format of the answer or permissible answers.

Figure 3:
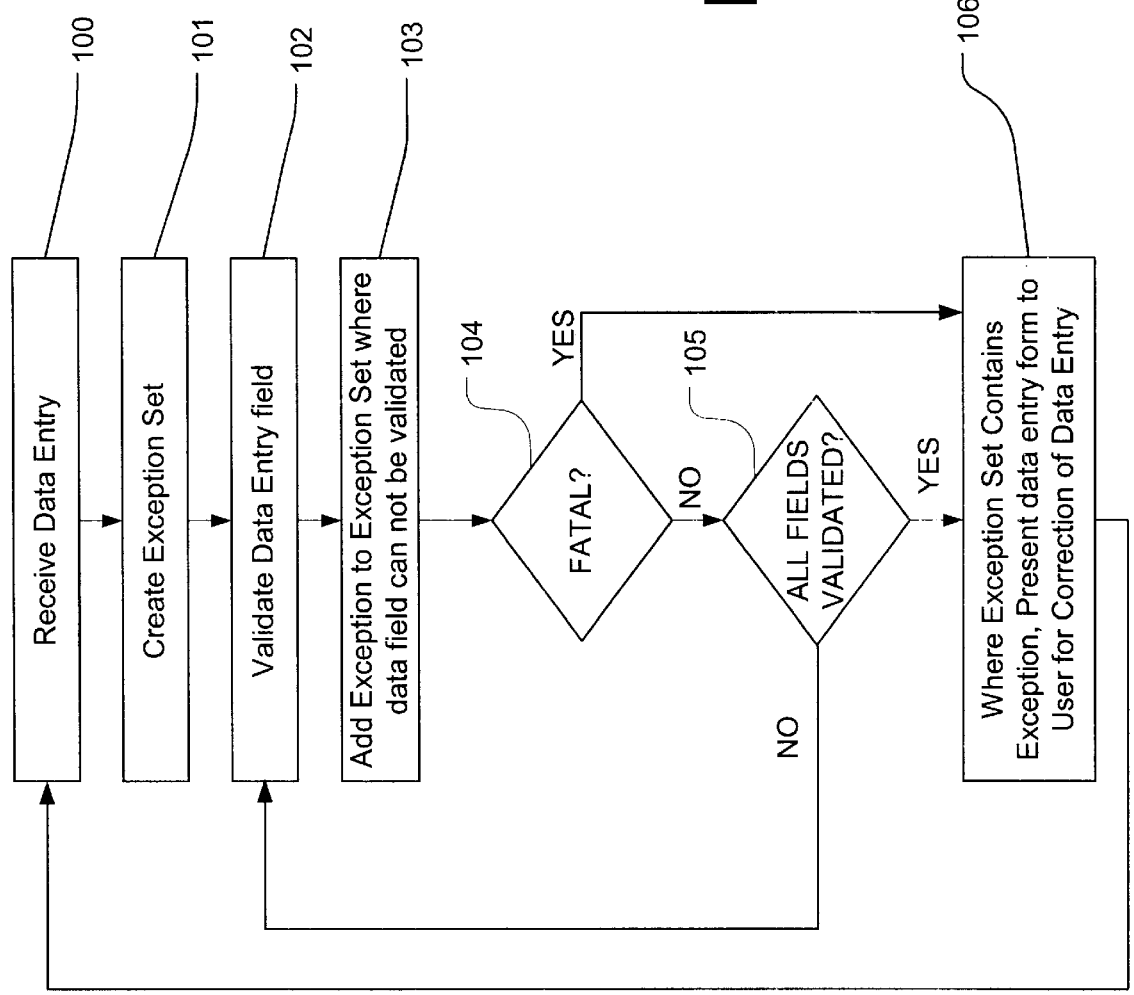
FIG. 3 is a flowchart illustrating the method of the present invention.

With reference to FIG. 3, a flow chart describing the method of the present invention is shown. Initially, answer/response data is received (100) by the server 250 from client-side terminal 200. An exception set is created to identify all fields of data that are found not to conform to the validation rules (101). Each field of received data is validated (102). During validation, each field of data is reviewed and compared to a predetermined criteria and/or validation rules. Where a field of data does not meet a predetermined criteria and/or a validation rule, an exception identifying the field which does not meet the predetermined criteria and/or the validation rule is generated and added to the exception set created at 101 (103). The exception set is, for example, a data object that may be called into action or thrown, when the exception set contains exceptions.

It is then determined if the exception is fatal (104). A fatal exception is an error or other condition that would not warrant any further validation of data until such time as the error or condition has been corrected/resolved. For example, an alphabetic character entered into a data field that requires numbers only could constitute a fatal exception. Where a fatal exception occurs, the exception set is presented to the user via the server application for re-entry or correction of data (106). Otherwise, it is determined whether all fields of submitted data have been validated (105). If so, then the exception set is presented to the user via the server application for re-entry or correction of data (106). Otherwise the next field of submitted data is validated (102). Once all fields of submitted data have been reviewed 106, the exception set 106 will be returned over the network 1 (FIG. 1) to the client-side terminal 200. Those fields of data that are identified in the exception set will be presented to the user again via the GUI 600 (FIG. 2) for data re-entry/correction of errors.

Figure 4:
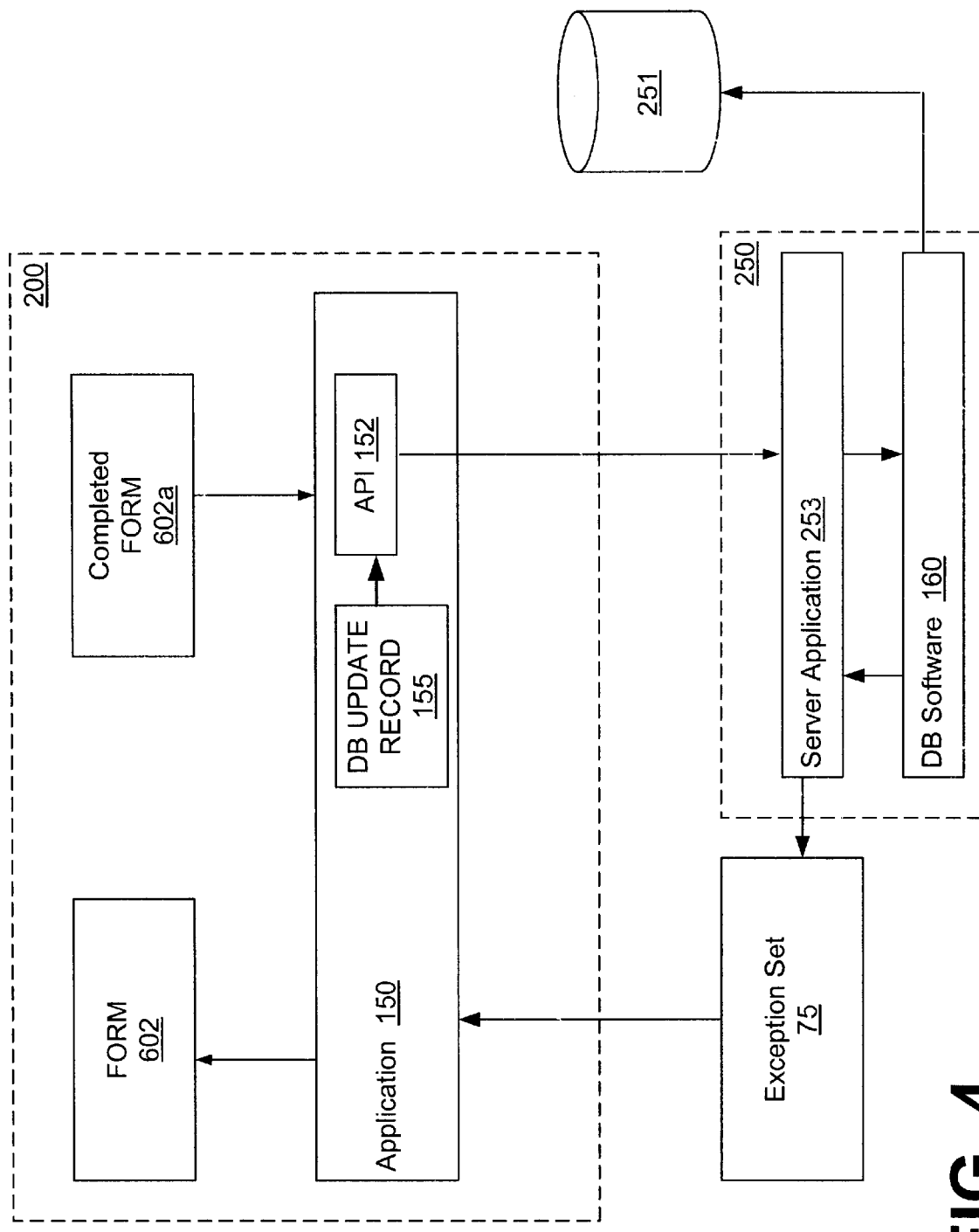
FIG. 4 is a further illustration of one embodiment of the system of the present invention.

With reference to FIG. 4 and FIG. 2 a diagram illustrating one embodiment of the system of the present invention is shown. There is an application 150, which includes an application-programming interface (API) 152. Application 150 may be, for example, an e-commerce application or the like. Application 150 may be installed and run on client-side terminal 200 or downloaded from database server 250 as, for example, an applet. Application 150 causes a data entry form 602 to be generated, which incorporates a question or questions to be presented to a user as a GUI 600 (FIG. 2) on, for example, a display device 202 (FIG. 1). Once the user has completed answering the questions presented via entering data into data fields 61 through 64, application 150 causes a database (DB) update record 155 to be created. Database update record 155 specifies the data input by the user for a particular set of questions (51 through 54). This record is then passed through the API 152 to the server application 253, which in turn performs the database update via the database (DB) software 160. If this update fails because, for example, the data does not meet the criteria specified by the validation rules, the server application 253 will interact with the database software 160 to validate as many data fields as possible. Each error reported to the server application 253 will be added to an exception set as an exception. An exception specifies, for example, the data input field that contains data that cannot be validated. After all fields of data have been reviewed (validated), the exception set is returned to the application 150 which causes the data entry form 602 to be re-presented to the user for correction/re-entry of answer information to conform with the pre-determined criteria. If no exceptions are contained in the exception set, the server application 253 and the database software 160 causes the database 251 to be updated to include the data. When the application 150 receives an empty exception set, it continues with the next step (often the capture and submission of a different set of data to the database).

Database software 160 may be, for example, an Oracle™ database package with Java Database Connectivity (JDBC) interface, EX or Microsoft™ Object Oriented Database Connectivity (MS ODBC) interface. JDBC is an application-programming interface (API) for linking Java™ programs to a database system. JDBC allows linking of any Java based program to any database utilizing the JDBC interface. In an alternative embodiment of the data survey collection system, database software 160 may be a special purpose application designed especially for, and/or integrated into, the data survey collection system.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The application 150 (FIG. 4), database software 160 and server application 253, each comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium then compiled, interpreted or otherwise processed in a suitable manner, if necessary, and then stored in a computer memory.

Figure 5:
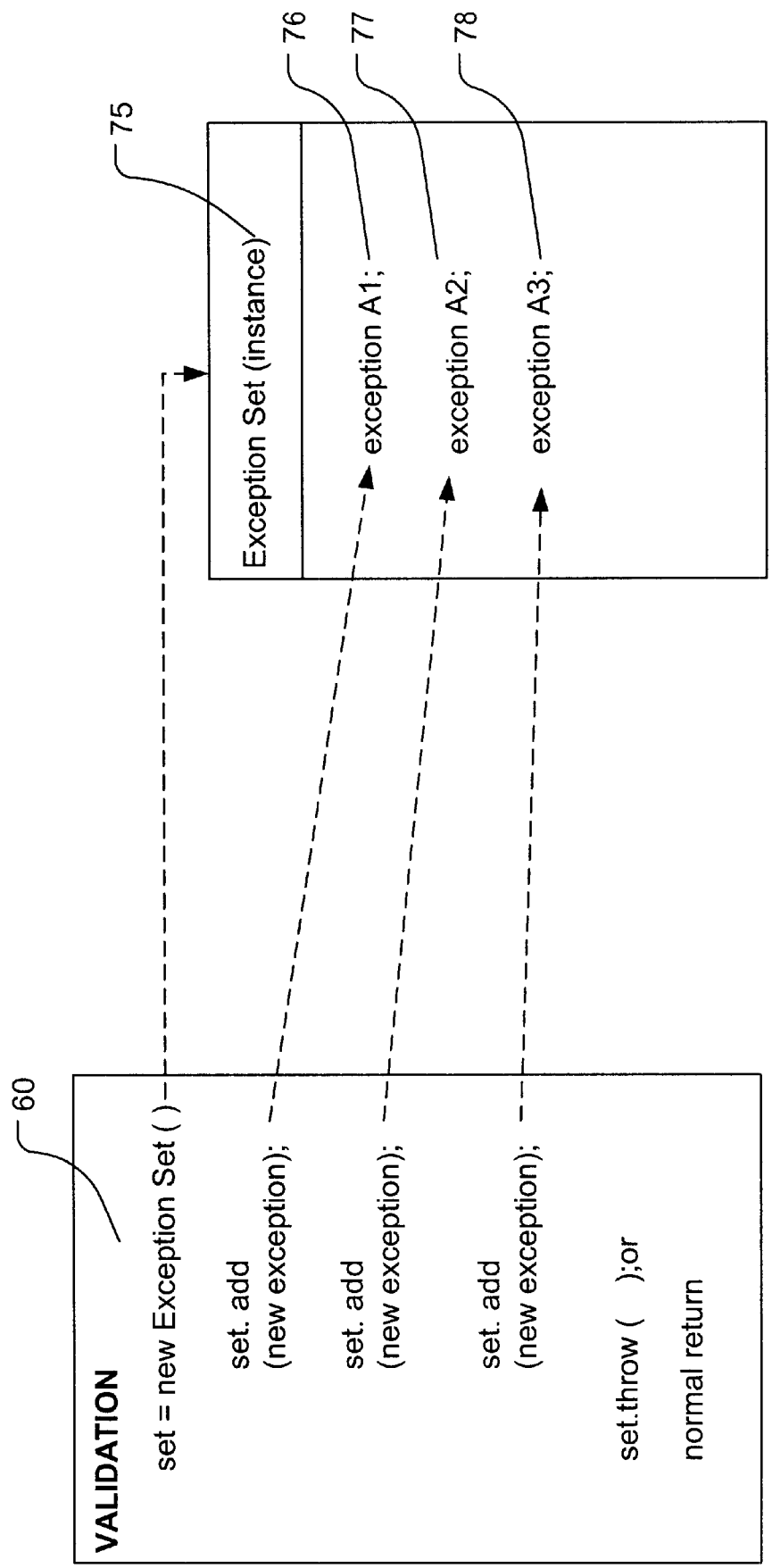
FIG. 5 is a diagram illustrating a validation routine and exception set class.

FIG. 5 illustrates a validation routine 60 that creates an instance of an exception set class (exception set) 75. The validation routine specifies that for each field of data presented for validation that does not meet a predetermined criteria and/or a validation rule, an exception will be added to the exception set 75. More particularly, in FIG. 5, the validation routine 60 has added exceptions 76 through 78 to the exception set 75 to indicate that certain answer data A1 through A3, respectively, cannot be validated. The exception set 75 will then be used to cause the questions and answer fields associated with the specified answer data to be re-presented to the user for correction/re-entry of the answers that could not be validated.

Figure 6:
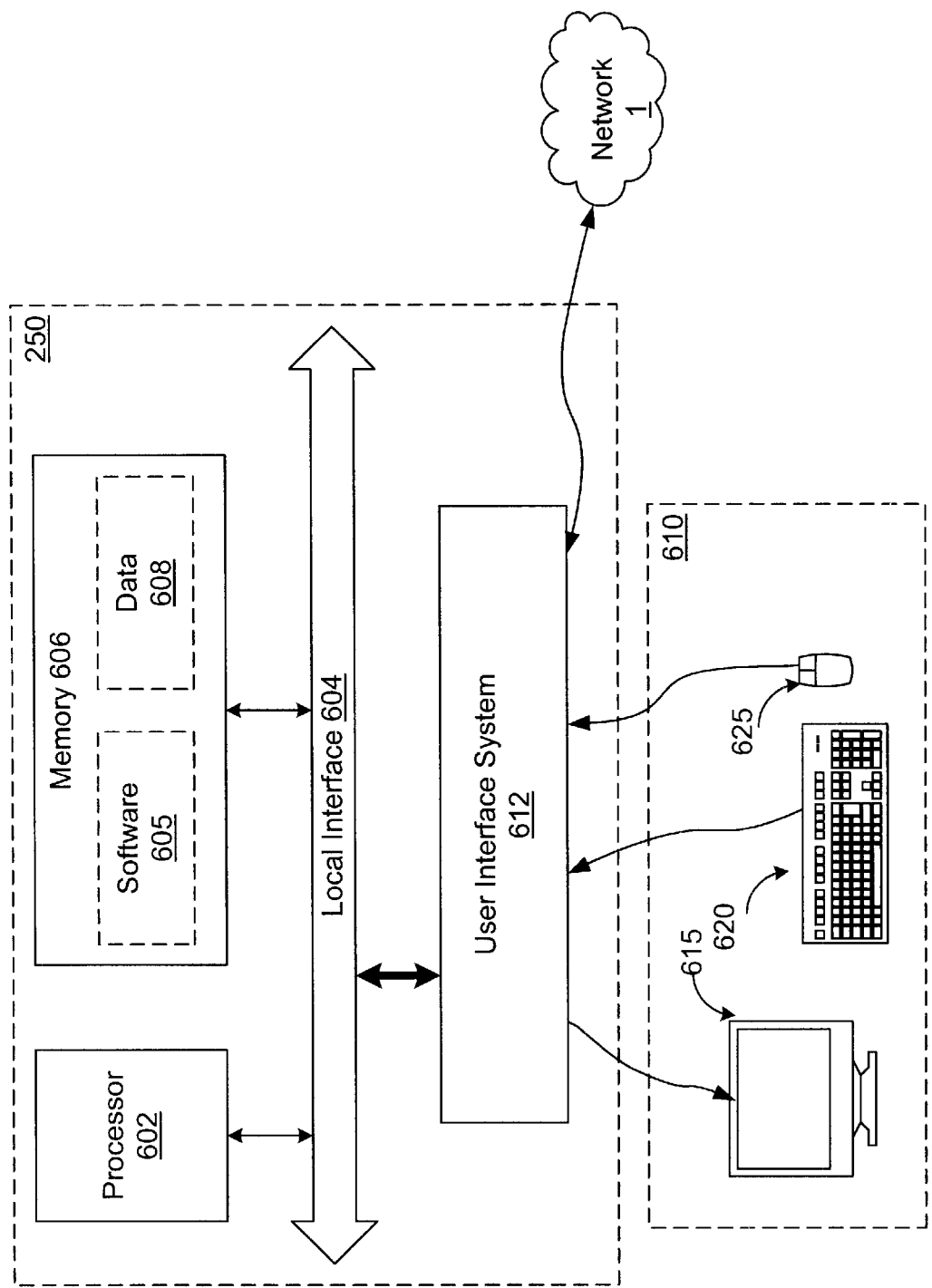
FIG. 6 is a block diagram illustrating an embodiment of a database server 250.

FIG. 6 illustrates one embodiment of a database server 250 which is set up to interface with a client-side terminal 200 via network 1 (FIG. 1). There is provided a processor 602, a local interface bus 604, a storage memory 606 for storing electronic format instructions (software) 605 and data 608. Further, storage memory 606 can include both volatile and non-volatile memory. An input/output interface 612 is provided for interfacing with, for example, the network 1, a display 615, and input devices such as a keyboard 620 and pointing device 625. Processor 602 controls and grants access to the data stored in memory 606 and database 251 (FIG. 1) in accordance with the instructions stored on memory 606. Further, processor 602 controls the execution of instructions stored on storage memory 606. The electronic instructions (software) 605 necessary to receive and validate data input and incorporate it into database 251 (FIG. 1). Database 251 may be stored as data 608 on memory storage 606 if desired. Software 605 may include, for example, server application 253 as well as database software 160, if desired. Server 250 may be configured so as to receive input via the user input interface 610. User input interface may include devices such as keyboard 620 or pointing device 625.

Figure 7:
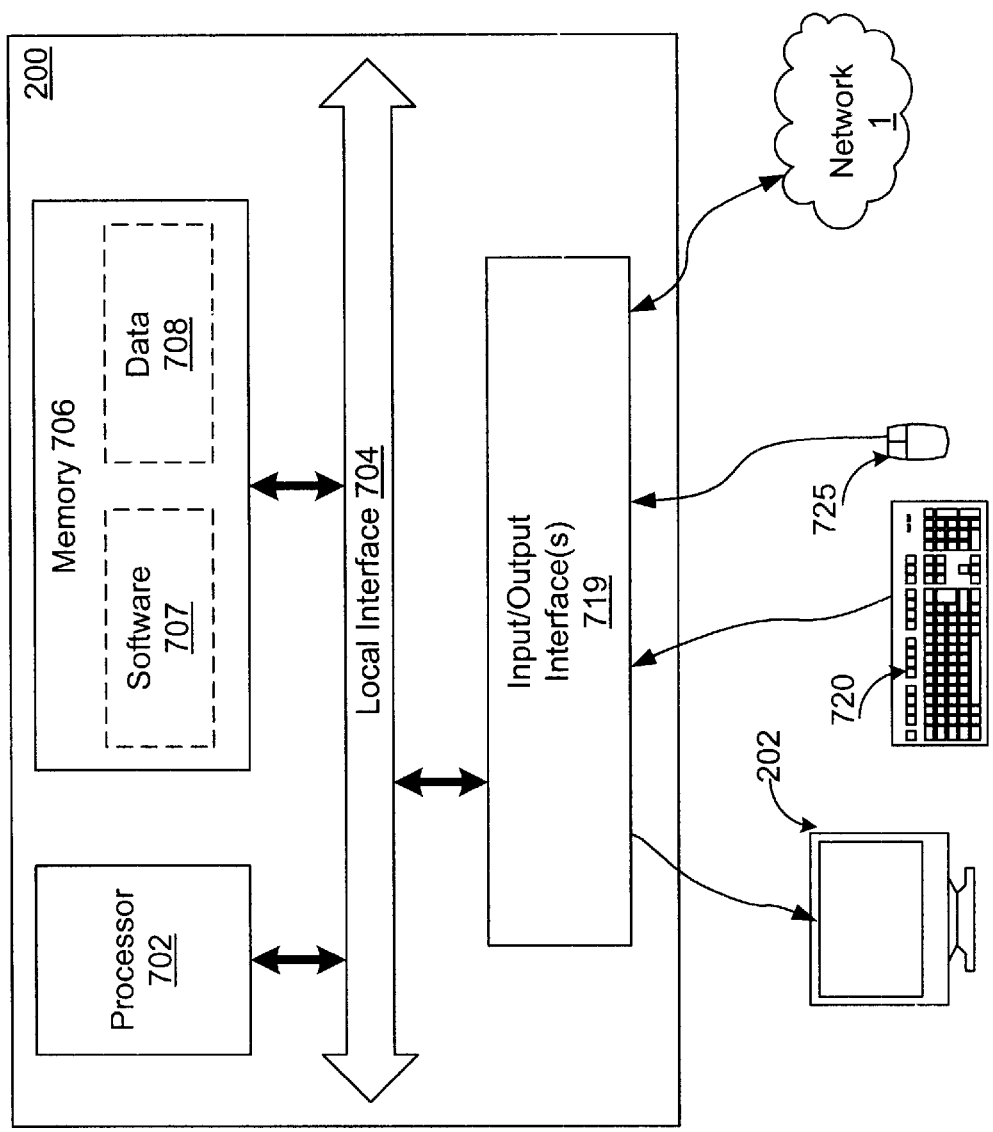
FIG. 7 is a block diagram illustrating an embodiment of a client-side terminal 200.

With reference to FIG. 7, a block diagram of client-side terminal 200. It can be seen that there is provided a processor 702, a local interface bus 704, a storage memory 706 for storing electronic format instructions (software) 707 and data 708. Storage memory 706 can include both volatile and non-volatile memory. An input/output interface 719 is provided for interfacing with, for example, the network 1, a display 202, and input devices such as a keyboard 720 and pointing device 725. Processor 702 preferably controls and grants access to data 708 stored in memory 706 in accordance with software 707 stored on memory 706. The software 707 may include software application 150 (FIG. 4), which may be, for example, an e-commerce application or the like.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of validating data submitted to a database application comprising the steps of:

receiving data input in response to a query presented to a user;

comparing said data with a predetermined validation criteria;

adding a criteria exception rule to an exception set where said data fails to meet said predetermined validation criteria, said exception identifies a data field of said data input which does not meet said validation criteria;

comparing said data to a validation rule;

adding an exception rule to said exception set;

presenting said exception set to a user for review;

accepting a corrected data input from said user;

comparing said corrected data input with said predetermined validation criteria;

comparing said corrected data input with said validation rule;

adding said criteria exception when said corrected data input fails to compare with said predetermined validation criteria; and adding said rule exception when said corrected data input fails to compare with said validation rule.

2. A method of validating data submitted to a database application comprising the steps of:

receiving data input in response to a query presented to a user;

comparing said data with a predetermined validation criteria;

adding a criteria exception rule to an exception set where said data fails to meet said predetermined validation criteria, said exception identifies a data field of said data input which does not meet said validation criteria;

wherein said data input comprises a data field; and wherein said data field is associated with a throwable object where said data field cannot be validated.

3. The method of claim 2, wherein said throwable object comprises an exception.

* * * * *